(12) United States Patent
Mattikalli et al.

(10) Patent No.: US 8,880,381 B2
(45) Date of Patent: Nov. 4, 2014

(54) OPTIMIZATION OF PROCESSOR CHARACTERISTICS AND LARGE SCALE SYSTEM OPTIMIZATION THROUGH DOMAIN DECOMPOSITION

(75) Inventors: Raju S. Mattikalli, Sammamish, WA (US); Arnold Nordsieck, Bellevue, WA (US); Karthik Kesavan, Everett, WA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 12/896,421

(22) Filed: Oct. 1, 2010

(65) Prior Publication Data

US 2012/0084541 A1     Apr. 5, 2012

(51) Int. Cl.
*G06F 7/60*     (2006.01)
*G06F 17/10*   (2006.01)
*G06Q 10/04*   (2012.01)

(52) U.S. Cl.
CPC ...................... *G06Q 10/04* (2013.01)
USPC ............................................................ 703/2

(58) Field of Classification Search
USPC ............................................................ 703/2
See application file for complete search history.

(56) References Cited

U.S. PATENT DOCUMENTS

| | | | |
|---|---|---|---|
| 8,022,843 B2* | 9/2011 | Mitchell et al. | 340/973 |
| 2006/0215825 A1* | 9/2006 | Boutin et al. | 379/111 |
| 2011/0134934 A1* | 6/2011 | Arroyo et al. | 370/431 |

OTHER PUBLICATIONS

Oyman et al. "Multiple Sink Network Design Problem in Large Scale Wireless Sensor Networks", 2004.*
Fortune et al. "WISE Design of Indoor Wireless Systems: Practical Computation and Optimization", 1995.*
Hasan et al. "Designing The Joint Tactical Radio Systems (JTRS) Handheld, ManPack, and Small Form Fit (HMS) Radios for Interoperable Networking and Waveform Applications", 2008.*

* cited by examiner

*Primary Examiner* — Omar Fernandez Rivas
*Assistant Examiner* — Bernard E Cothran

(57) ABSTRACT

Systems and methods for optimizing processor requirements for a complex hardware system are disclosed. A set of complex hardware system configuration constraints are formulated as an objective function and a set of linear inequalities, and a convex polytope is formed from the set of linear inequalities. The objective function is optimized over the convex polytope using mixed integer linear programming means to obtain an optimal solution. Processor requirements for the complex hardware system are determined based on the optimal solution.

29 Claims, 8 Drawing Sheets

OPTIMIZATION OF PROCESSOR CHARACTERISTICS AND LARGE SCALE SYSTEM OPTIMIZATION THROUGH DOMAIN DECOMPOSITION

FIELD

Embodiments of the present disclosure relate generally to networked computer configuration. More particularly, embodiments of the present disclosure relate to processor optimization in complex hardware systems and computer networks.

BACKGROUND

As aircraft become more sophisticated, there is an ever increasing need for computational processing power in complex hardware systems. In order to meet the computational processing power need, new generations of faster processors are generally used. The faster processors permit significant increases in integration and complexity of the complex hardware systems compared to previous generations of processors. Determining a set of optimized processors (quantities and capabilities) to meet growing computing needs within a real-time context of a complex hardware system can be a very difficult problem. Previously, engineers would start by selecting a particular kind of processor, and then proceed to estimate a number of instances of the processor required. The estimate of the number of instances would require meeting computational requirements with assumed margins for schedule-ability given manual assessment of application needs for redundancy, separation, I/O and other resources. Such a process of examining an adequacy of the selected processors is a time consuming process which may still result in an inadequate margin of resources or number of processors. Uncertainty in selection of processors can be a source of considerable uncertainty in complex hardware system development efforts.

SUMMARY

Systems and methods for optimizing processor requirements and large scale system optimization for a complex hardware system is disclosed. A set of system configuration constraints are formulated as an objective function and a set of linear inequalities, and a convex polytope is formed from the set of linear inequalities. The objective function is optimized over the convex polytope using mixed integer linear programming means to obtain an optimal solution. Processor requirements for the system are determined based on the optimal solution. The systems and methods optimize a very large system and determine an optimal number and capability of processors to provide computational resources for such a system. In this manner, development and performance optimization of networked systems such as avionics network systems is significantly simplified, while operational and functional requirements of a set of known real-time applications of the network system are met. Furthermore, networked systems weight can be minimized, and an ability to absorb configuration changes can be maximized by centering the design configuration. Additionally, networked systems optimized herein can minimize a cost of future changes while meeting total system safety constraints.

In a first embodiment, a method optimizes processor requirements for a system. The method formulates a set of system configuration constraints as a set of linear inequalities and an objective function, and forming a convex polytope from the set of linear inequalities. The method also optimizes the objective function over the convex polytope using mixed integer linear programming means to obtain an optimal solution, and determines processor requirements for the system based on the optimal solution.

In a second embodiment, a processor requirements optimization system comprises an input module operable to receive a set of system configuration constraints formulated as a set of linear inequalities and an objective function. The system also comprises a mixed integer linear programming module operable to optimize the objective function over a convex polytope of the set of linear inequalities to obtain an optimal solution. The system also comprises a determining module operable to determine processor requirements for the system based on the optimal solution.

In a third embodiment, a system for resource allocation for a complex hardware system comprises logic for determining a centered sensor/effector wire allocation to concentrator nodes. The system further comprises logic for determining a centered parameter allocation to messages, determining a centered message allocation to virtual links, and determining a centered application allocation to processors. The system also comprises logic for reporting a centered system resource allocation, if a centered system resource allocation meets margin requirements.

In a fourth embodiment, a method of system resource allocation provides centered sensor/effector wire allocation to concentrator nodes. The method further provides centered parameter allocation to messages, centered message allocation to virtual links, and centered application allocation to processors. The method then reports a centered system resource allocation, if a centered system resource allocation meets margin requirements.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
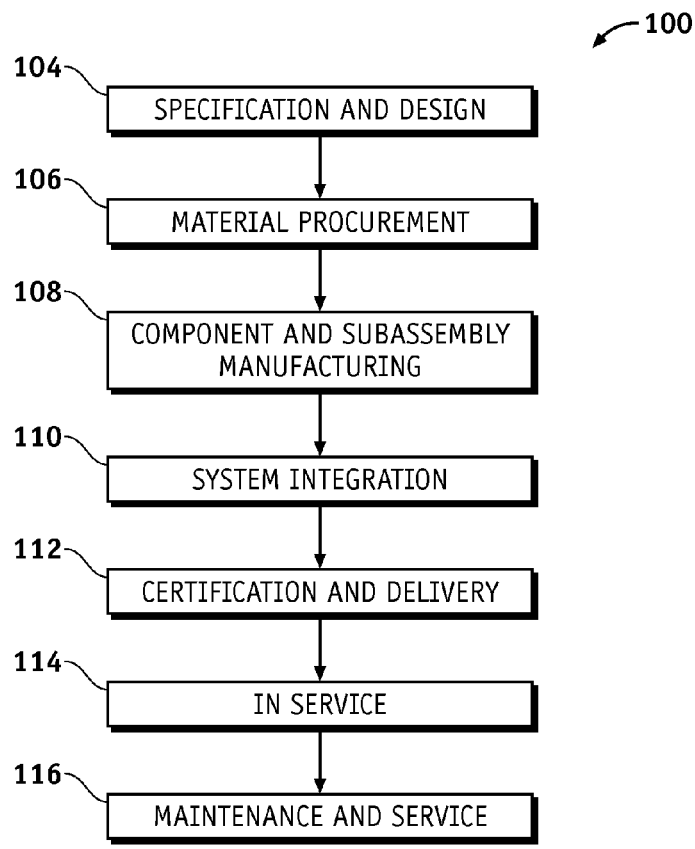
FIG. 1 is an illustration of a flow diagram of an exemplary aircraft production and service methodology.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to processor design, common core system (CCS), complex hardware systems, computation, mathematical formulation, and other functional aspects of the systems (and the individual operating components of the systems) may not be described in detail herein. In addition, those skilled in the art will appreciate that embodiments of the present disclosure may be practiced in conjunction with a variety of computational machines, and that the embodiments described herein are merely example embodiments of the disclosure.

Embodiments of the disclosure are described herein in the context of a practical non-limiting application, namely, optimizing resources in a complex hardware system such as an avionics system. Embodiments of the disclosure, however, are not limited to such avionics applications, and the techniques described herein may also be utilized in other optimization applications. For example, the embodiments may be applicable to complex hardware systems optimization, such as but without limitation, naval systems optimization, naval air/sea/ground weapons control systems optimization, submarine acoustic analysis system optimization, air traffic control systems optimization, healthcare information systems optimization, acoustic and electromagnetic signal processors optimization, flight control systems optimization, systems controllers optimization, navigation controllers/systems optimization, and the like. In addition, the embodiments may be applicable to optimizing complex hardware systems, such as but without limitation, maritime/surface/subsurface, ground, space, and air vehicle systems, such as aircraft, spacecraft, space launch vehicles, automobiles, ground vehicles, submarines, ships, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 2:
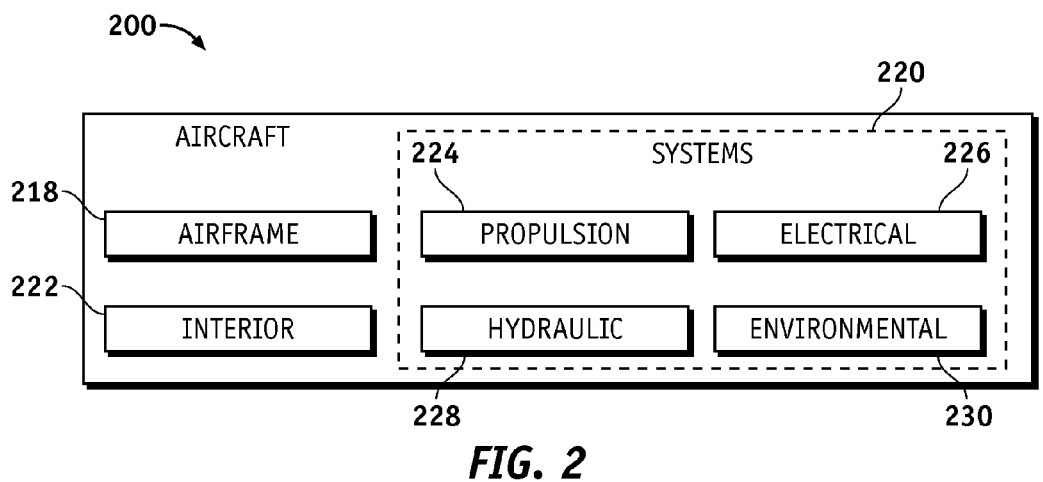
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. Also, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

As mentioned above, to meet the computational processing power need, new generations of faster processors are generally used. The faster processors permit significant increases in integration and complexity to the networked systems compared with previous generations of processors. This observation identifies two problems to be solved and requiring an approach which is described herein: 1) The optimization of a very large system and 2) The determination of the optimal number and capability of processors to provide computational resources for such a system.

The optimization of a very large system may be very difficult because it requires such large numbers of variables that the computational complexity results in prohibitive computation time with current methods. In practice, a decomposition of the system into loosely coupled domains is required, employing a piecewise iterative process to determine interim solutions for those domains in the system. As this is extremely time consuming and a solution may not even be possible, if a solution is achieved it is due to happenstance or excessive use of resources, which in either case results in less than optimal results.

Modern avionics systems comprise a vast variety of elements, for example but without limitation, sensors, communication devices, navigation devices, actuators, backup devices, analysis modules, application software programs, computation resources, optical fibers, and the like. In order to reduce complexity and required resources, the vast variety of elements are consolidated where possible and practical.

Figure 3:
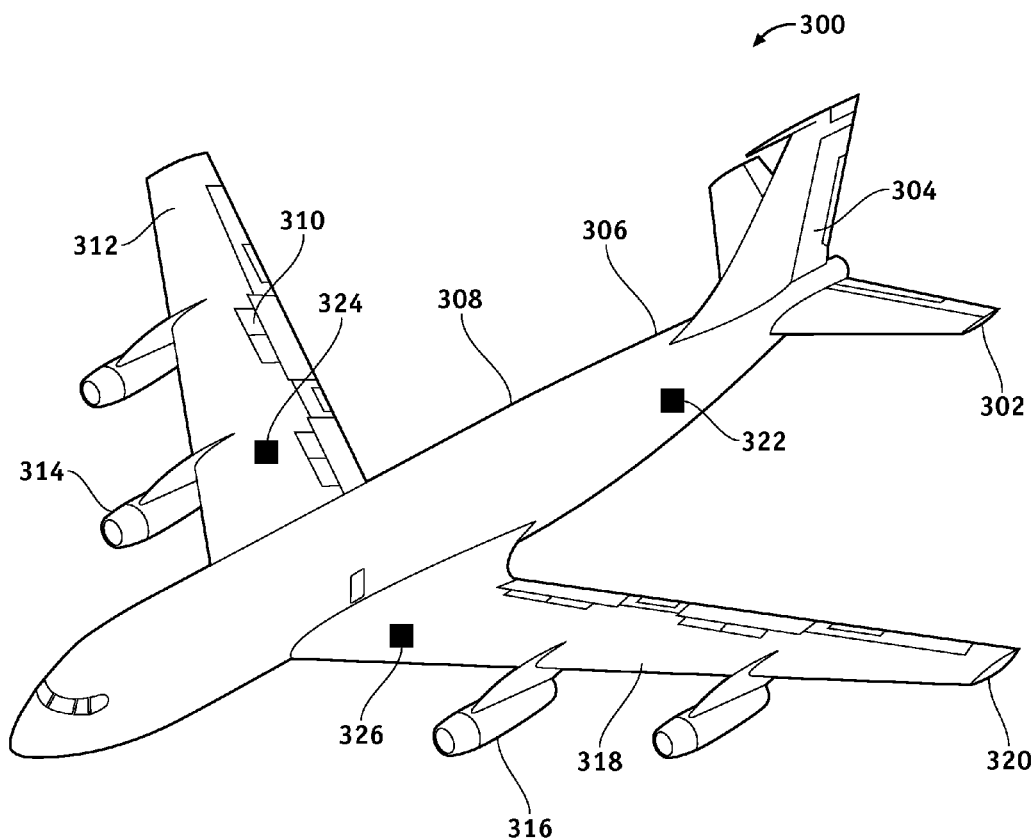
FIG. 3 is an illustration of an aircraft showing exemplary locations of computational units and sensors of an avionics system.

FIG. 3 is an illustration of an aircraft showing exemplary locations of sensors/actuators 302-320 and concentrator nodes 322-326 of an avionics system 300. However, embodiments of the disclosure are not limited to such avionics systems; the embodiments may be applicable to other complex hardware systems and complex products as mentioned above. An avionics system may be vastly more complex than the small number of elements depicted for the avionics system 300. The avionics system 300 comprises elevator position sensor 302, rudder position sensor 304, lavatory smoke detector sensor 306, cabin temperature sensor 308, spoiler actuator 310, fuel sensor 312, engine throttle actuator 314, engine sensor 316, flap actuator 318, navigation light actuator 320, and concentrator nodes 322/324/326.

The elevator position sensor 302 comprises an encoder coupled to an elevator. The elevator position sensor 302 may periodically transmit a data packet comprising position information for the elevator.

The rudder position sensor 304 comprises an encoder coupled to a rudder. The rudder position sensor 304 may periodically transmit a data packet comprising position information for the rudder.

The lavatory smoke detector sensor 306 comprises an electronic detector monitoring the status of a lavatory (not shown). The lavatory smoke detector sensor 306 may transmit a data packet comprising smoke detection information in response to a smoke event. Since the data packet may be sent at an unknown time, resources must be allocated for the data packet, but the resource allocation must not interfere with vital communications.

The cabin temperature sensor 308 comprises an electronic temperature monitor the temperature of a cabin. The cabin temperature sensor 308 may transmit a data packet comprising temperature information periodically or in response to an excess temperature event.

The spoiler actuator 310 comprises an actuator for positioning a spoiler. The spoiler actuator 310 receives a command packet in response to a pilot direction and sets spoiler positions accordingly.

The fuel sensor 312 comprises a fuel monitor for measuring fuel in a fuel tank. The fuel sensor 312 transmits a data packet comprising fuel information periodically or in response to a low fuel event.

The engine throttle actuator 314 comprises an actuator for setting an engine throttle (not shown) position. The engine throttle actuator 314 receives a command packet in response to a pilot command and sets the engine throttle accordingly.

The engine sensor 316 comprises an electronic sensor box for monitoring a variety of engine parameters. The engine sensor 316 transmits a data packet comprising engine operation information periodically.

The flap actuator 318 comprises an actuator for setting a flap (not shown) position. The flap actuator 318 receives a command packet in response to a pilot command and sets the flap position accordingly.

The navigation light actuator 320 comprises an actuator for turning navigation lights (not shown) on or off. The navigation light actuator 320 receives a command packet in response to a pilot direction and sets the light status accordingly.

The concentrator nodes 322/324/326 comprise network routers for controlling data packet transfers to and from the sensors/effectors 302-320.

Figure 4:
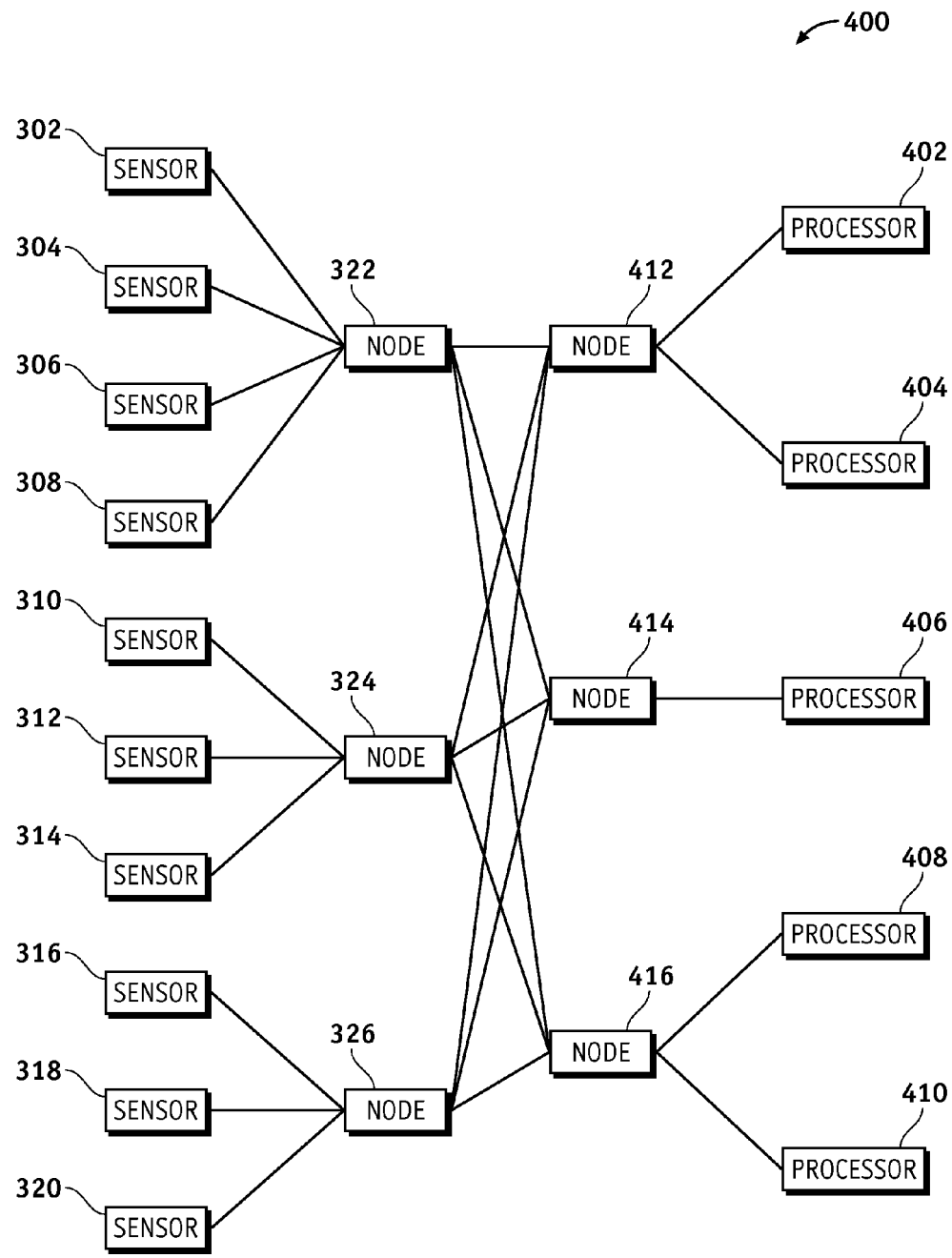
FIG. 4 is an illustration of an exemplary architecture of an avionics system according to an embodiment of the disclosure.

FIG. 4 is an illustration of an exemplary architecture of an avionics system 400. The avionics system 400 may comprise sensors/effectors 302-320, concentrator nodes 322-326 and 412-416, and processors 402-410.

The sensors/effectors 302-320 are described above, and send and receive data packets according to their requirements. The sensors/effectors 302-320 needs are characterized by interface types and performance while incurring wire weight.

A functional implementation of the concentrator nodes 322-326 and 412-416 comprises a limited number of analog, discrete, and serial digital interfaces. The concentrator nodes 322-326 and 412-416 functions require a firm schedule to process packets from the sensors/effectors 302-320. In addition, processing interfaces to the sensors/effectors 302-320 consume the concentrator nodes 322-326 and 412-416 processor performance. The scheduling of the concentrator nodes 322-326 and 412-416 must also satisfy the latency constraints place by requirements. The outcome of this is an allocation of each of interfaces to the sensors/effectors 302-320 of the concentrator nodes 322-326 and 412-416 with a first order processing schedule for the concentrator nodes 322-326 and 412-416.

The processors 402-410 process various applications to support the sensors/effectors 302-320 as well as other avionics applications. The computing needs of an application are characterized by an execution time parameterized by processor speed, a strict (non-pre-emptible) execution period, and memory requirements. Processor resource allocation is discussed below.

Figure 5:
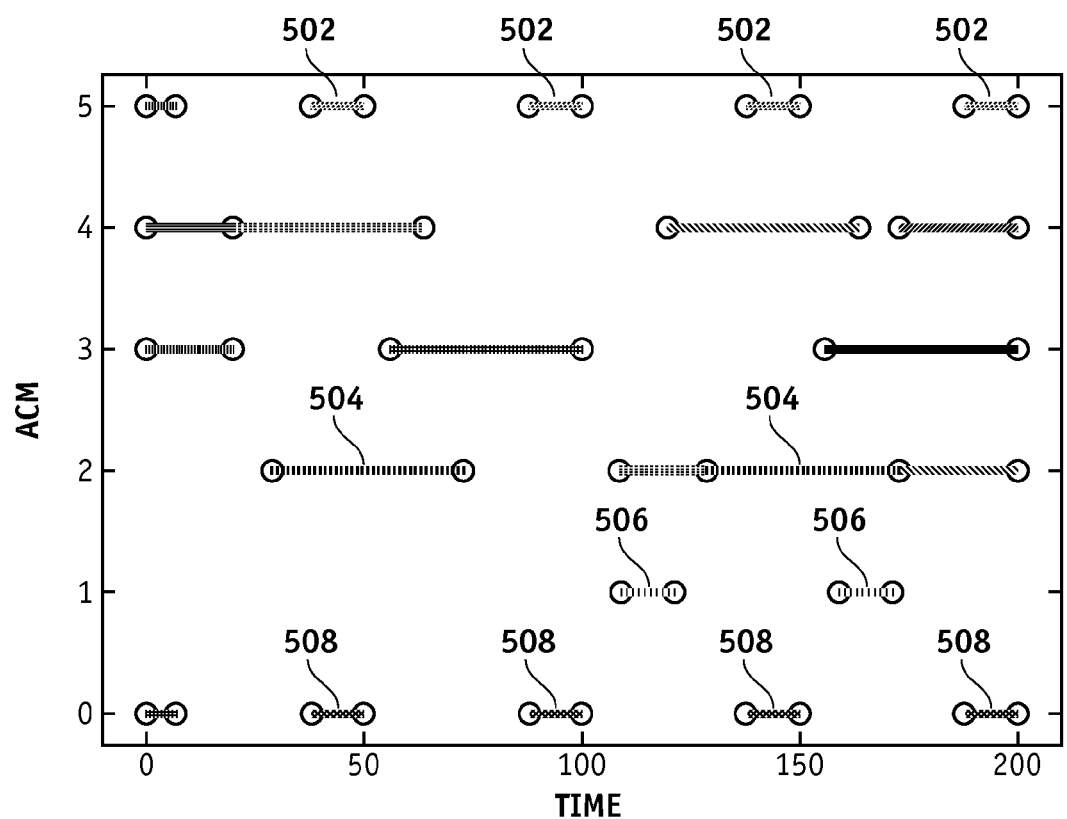
FIG. 5 is an illustration of an exemplary non-optimized processor resource allocation over a period of time.

FIG. 5 is an illustration of an exemplary non-optimized processor resource allocation over a period of time. FIG. 5 shows six application computation modules (ACMs or processors) 0-5 with applications allocated to them. Four periodic instances of application 502 are allocated to the processor 5, two periodic instances of application 504 are allocated to the processor 2, two periodic instances of application 506 are allocated to the processor 1, and four periodic instances of application 508 are allocated to the processor 0. As shown in FIG. 5, processors 0 and 1 are relatively lightly loaded, and thus the processor resource allocation is non-optimal.

Existing methods to design avionics processors are time consuming, iterative and do not support systematic tradeoffs among various design options. Embodiments of the disclosure provide breakthrough design capability to complex hardware system designers. In particular, by mathematically optimizing relevant application and system characteristics and producing solutions that guarantee the availability of shared resources among applications, the embodiments of the disclosure supports systematic exploration of the design space. The embodiments significantly simplify the development and performance optimization of networked systems, and may also simplify certification of same.

Avionics processor design requires a careful analysis of the computing needs of avionics applications. A set of processors may collectively meet the needs of the avionics applications. This necessitates the consideration of how the applications are allocated to the processors. In addition to computing needs, applications have communication and input/output (I/O) needs which work in close conjunction with their computing needs. Because of this, it is necessary to consider communication and I/O needs as well during processor design. Embodiments of disclosure seek optimal values for processor designs that provide a stated margin on resource utilization.

By seeking a stated margin, the embodiments not only allow room for future growth in the applications, but also produce a more "centered" utilization of all the resources. Design centering allows evenly spreading work among all resources without causing bottlenecks in resource utilization.

In one embodiment, avionics applications are known apriori, characterized by their execution time, periodicity, memory consumption and input/output messages to a network. Fault tolerance and redundancy requirements are addressed through requirements on separation and habitation among the applications. In existing solutions, the processor capability is given; and an optimized allocation of applications to processors is obtained accordingly. In contrast to the existing solutions, in the embodiments described herein the processor capability is not known; and optimal values of processor capabilities are obtained satisfying overall needs of the applications with the stated margins. An algorithmic process that has not been available before is described herein to solve such a problem by optimizing the design of compute resources to meet the needs of a specified set of avionics applications. The process has not been available before because of at least two reasons: (a) a unique set of conditions that need to be met by an avionics system, and (b) a known NP-hard computational complexity of such a problem (i.e., one that couples design with allocation and scheduling). Roughly, a problem being NP-hard implies that compute resources needed to solve the problem grow exponentially with problem size. Solutions to such problems typically are combinatorial in nature; exploring all possible combinations, even for moderate sized problems may very rapidly approaches many thousands of years of compute time, even on the fastest processors available.

Embodiments of the disclosure solve a problem of determining an optimized avionics system that meets operational and functional requirements of a set of known real-time avionics applications. Embodiments of the disclosure center a design configuration to maximize an ability to absorb changes, thereby minimizing a cost of future changes, while meeting total system safety constraints. This process is iterated on in a manner to achieve convergence while assuring a safe system design.

In this manner, an optimal design for processors within a real-time avionics system such as the avionics system 400 is determined as described below by considering the computing, communication, and I/O needs of a given set of avionics applications that consume system resources. As mentioned above, computing needs of an application are characterized by an execution time parameterized by processor speed, a strict (non-pre-emptible) execution period, and memory requirements. The communication needs are characterized by a number of virtual links (point to multipoint communication links) required by an application, along with the communication bandwidth of the virtual link. The I/O needs are characterized by the memory size and port type required within a processor's end-system. As described herein, the processor design problem is solved in a way that allows optimization of a variety of objective functions related to margins on various resources, while ensuring that application needs are satisfied. A main technical hurdle overcome by embodiments of the disclosure is that of scale. The optimal design for the processors solves a problem involving up to tens of processors, hundreds of applications, and thousands of messages, with each processor employed to a targeted level of capacity, leaving the rest for margin. Such margins and problem sizes are typical of modern avionics networks and as such allow embodiments of the disclosure to be applied to these problems. Such a numerical design approach, involving a large, multi-dimensional and tight allocation and scheduling problem, has not previously been developed. A capability provided by the optimal design of the processors enables avionics system development on commercial and military aircraft. Existing methods to design avionics processors are time consuming, extensively iterative, and do not support systematic tradeoffs among the various design options. In particular, by mathematically optimizing relevant application and system characteristics and producing solutions that guarantee the availability of shared resources among applications, the optimal design for the processors described herein supports systematic exploration of the design space. In this manner, development, performance optimization and certification of networked systems such as the avionics system 400 is significantly simplified.

Consider a set of n applications $\tau_i$, i=1, ..., n. Consider a set of m processors $g_j$, j=1, ..., m, where n is generally much larger than m. Each application should be assigned to a single processor such as each of the processors 402-410 in a way that resources available at each of the processors 402-410 can be adequately shared by the applications assigned to it. Different applications require different quantities of resources. The number of applications n and resource needs of each application are known. What is not known is: (a) level of resources that is sufficient (with stated margins) to meet collective needs of all applications, and (b) particular assignment of applications to the processors 402-410. Compute, communication, and I/O resources at the processors 402-410 and consumption needs of these resources by the applications is mathematically characterized. A set of variables corresponding to (a) unknown resource levels, and (b) unknown assignment of the applications to the processors 402-410 is then formulated. These two quantities are related to each other. Required resource levels at each of the processors 402-410 depend on an assignment of applications to the processors 402-410, while the application in turn depend on resource levels of each of the processors 402-410 that the application is assigned to. Embodiments of the disclosure mathematically establish this two-way dependency by parameterizing the application needs in terms of resource levels and then construct a mathematical formulation in terms of the unknown resource levels. An objective function in terms of resource margins is then formulated, and unknown resource levels are then solved for using the optimization methods described herein. For the sake of brevity a brief description of the formulation and corresponding constrains is provided herein.

Constraints that apply are as follows:

1) Applications require a specified amount of execution time on each of the processors 402-410 at a specified periodicity.

2) Execution schedules of applications on each of the processors 402-410 should not overlap.

3) Specific application cohabitation and separation constraints exist: among applications, between the applications and the processors 402-410, and between the applications and cabinets (e.g., computer cabinets or racks).

4) Application memory requirements—Applications require specific amounts of memory during their processing. This is provided by the processors 402-410. The total size of memory available for the applications on each of the processors 402-410 is fixed.

5) Application messaging requirements—Application utilize communication ports to send and receive messages. These communication ports use memory. An amount of memory available at each of the processors 402-410 to meet the messaging needs of the applications assigned to it is fixed.

6) Application messaging requirements—Applications utilize Virtual Links (VLs) to transmit and receive messages. A number of such VLs available on each of the processors 402-410 is fixed.

7) Application messaging requirements—Applications require specific amounts of bandwidth for communicating messages, which is provided to the communicating messages via the Virtual Links. A total amount of communication bandwidth available to the Virtual Links on each of the processors 402-410 is fixed.

Consider the following definitions for variables x (assignment variables) and d (scheduling variables):

Application system $\Gamma=\{\tau_i, i=1, \ldots, n\}$
Processors $G=\{g_i, i=1, \ldots, m\}$
$p_i, e_i$—period and execution time of i-th application
Period values $Q=(q_1, q_2, \ldots, q_r)$
Index in period values $l \in \{1, \ldots, r\}$
$x_{ijk} \in \{0,1\}$, 1 if occurrence of task j is in k-th bin of processor i
Bin index $k \in \{1, \ldots, H/q_1\}$
$d_{il} \in \{0,1\}$, if lowest period on processor i is $q_l$, 0 otherwise
where i, j, k, l, m, n, r and I are integers.

A processor design problem is formulated as a bin-sizing and bin-packing problem as follows. A time line on each of the processors 402-410 is divided into $q_1$ sized bins.

Consider an i-th processor among the processors 402-410. If a smallest value of the i-th processor application periods is $q_l$, consideration is made for super-bins of size $q_l$ to define the bin packing constraint. For a first super-bin, a binary variable $d_{il}$ to select bin size $q_l$ for processor i may be used.

To accumulate all applications of period $q_l$ within a super-bin, the super-bin is divided by a bin increment $q_1$, the super-bin then comprises $q_l/q_1$ bins. A sum total of execution times $e_j$ of applications assigned to a bin must be less than a size of the bin. This leads to the following constraint expression:

$$\sum_{k'=k+1}^{k+(q_l/q_1)} \sum_j x_{ijk'} e_j \leq q_l + (h - q_l)(1 - d_{il})$$

$$\forall k = 0, \frac{q_l}{q_1}, 2\frac{q_l}{q_1}, \ldots, \frac{(h - q_l)}{q_1}$$

$$\forall l = 1, \ldots, r$$

$$\forall i = 1, \ldots, m$$

Combined with the non-overlapping, strictly periodic scheduling requirements, the following mathematical programming formulation to describe the compute needs is obtained. The variable h defines the unknown processor speed within the processors 402-410.

$$\min \sum_{i=1}^{m} u_i \quad (1)$$

s.t.

$$\sum_i \sum_{k=1}^{p_j/q_1} x_{ijk} = 1 \quad \forall j = 1, \ldots, n \quad (2)$$

$$x_{ijk} \leq u_i \quad \forall i, j, k = 1, \ldots, p_j/q_1 \quad (3)$$

-continued $$\sum_{k'=1}^{p_j/q_1} \sum_{j: p_j \leq q_l} x_{ijk'} \frac{q_l}{p_j} e_j + \sum_{k'=k+1}^{k+(q_l/q_1)} \sum_{j: p_j > q_l} x_{ijk'} e_j \leq q_l + (h - q_l)(1 - d_{il}) \quad (5)$$

$$\forall k = 0, \frac{q_l}{q_1}, \frac{2q_l}{q_1}, \ldots, \frac{h - q_l}{q_1}; \forall l; \forall i$$

$$x_{ijk} \leq d_{il(l: p_j = q_l)} \quad \forall k = 1, \ldots, \frac{p_j}{q_1}; \forall j; \forall i \quad (6a)$$

$$h \geq 0 \quad (6b)$$

$$x_{ijk} \in \{0, 1\} \quad \forall k = 1, \ldots, (p_j/q_1); \forall i; \forall j \quad (9)$$

$$u_i, d_{il} \in [0, 1] \quad \forall l = 1, \ldots, r; \forall i \quad (10)$$

In the above formulation, the first statement (1) specifies the objective. The objective, in this case, is to minimize the number of processors u such as the processors 402-410. Constraint (2) above ensures that the assignments (x's) are chosen such that every application is assigned to one and only one processor $u_i$ from the processors 402-410. Constraint (3) ensures that if an application is assigned to the processor $u_i$, then the processor u gets counted as being used. Constraint (5) is a most significant part of this formulation, and relates the unknown assignment x and the unknown processor resource level h (e.g., such as processor speed) to each other. The constraint (5) ensures that the applications can be scheduled for the requisite execution time (e) with non-overlapping strictly periodic start times. Constraint (6a) ensures that if an application is assigned to a processor $u_i$, the processor $u_i$ is informed about scheduling the application. Remaining constraints define variable types and their bounds.

Other objective functions are formulated in similar ways. A general objective is to maximize the minimum resource margin on a processor whether this is bandwidth, virtual links, memory, or computing throughput—that is to center an allocation in the design space. Regarding computing throughput, different formulations may be used. For example, to maximize the minimum compute margin at the processor level, variable mc is defined as the minimum compute margin. Constraints on a value of mc can be stated by modifying constraint (2) above into (2a). The new objective function and modified constraint (2) can be stated as follows:

$$\max mc \quad (1a)$$

$$mc \leq H - \sum_j \sum_{k=1}^{p_j/q_1} x_{ijk} e_j H / p_j \quad \forall i \quad (2a)$$

where H is a hyper-period such that j-th task has $H/p_j$ occurrences in the hyper-period H.

Another possible objective function is to maximize the minimum compute margin at a minor frame level. Likewise, variable mmc is defined as a minimum value of the minor frame compute margin, and (1) and (5) above are modified as follows:

$$\max mmc \quad (1c)$$

-continued $$mmc \le q_l + (H - q_l)(1 - d_{il}) - \sum_{j: p_j \le q_l} \sum_{k'=1}^{p_j/q_1} x_{ijk'} \frac{q_l}{p_j} e_j - \sum_{j: p_j > q_l} \sum_{k'=kmod(p_j/q_1)+1}^{kmod(p_j/q_1)+(q_l/q_1)} x_{ijk'} e_j \quad (5e)$$

$$\forall k = 0, \frac{q_l}{q_1}, 2\frac{q_l}{q_1}, \ldots, \frac{(H - q_l)}{q_1}$$

$$\forall l = 1, \ldots, r; \forall i = 1, \ldots, m$$

A number of other resource margins can also be modeled. These can then be maximized or minimized by expressing the resource margins as the objective function, or can be bounded by expressing as a constraint. Such formulations produce combinatorial optimization problems which are of the form of a mixed-integer linear program (MILP). Embodiments of the disclosure can be used to formulate and solve these MILPs using MILP tools, for example but without limitation, CPLEX, CBC, Gurobi, and the like.

Next, the application cohabitation/separation constraints, the memory constraints, and the communication constraints are added as shown below in formulas 13-18, 21-25, 26-30, 31, 36, 37-39, 40, 51-55, 61-62.

Application cohabitation/separation requirements—The application cohabitation/separation requirements impose restrictions on the allocation of applications to processors 402-410. The application cohabitation/separation requirements may define the requirement to allocate a pair of applications to the same processor. The application cohabitation/separation requirements may also define the requirement to allocate an application to a specific processor or to any processor within a specific cabinet. Alternately, the application cohabitation/separation requirements may define the requirement that a specified pair of applications must not be allowed to be allocated to the same processor. The application cohabitation/separation requirements are implemented mathematically as described below listing requirements and their mathematical descriptions.

ACMSeparation constraint 26(b), which requires that a pair of applications $t_{j1}$ and $t_{j2}$ must be on separate application computation modules (ACM)s, is defined based on the following relationship:

$$\sum_{k=1}^{p_{j1}/q_1} x_{ij1k} + \sum_{k=1}^{p_{j2}/q_1} x_{ij2k} \le 1 \quad \forall i \quad (26b)$$

ACMCohabitation constraint (26), which requires that the pair of applications $t_{j1}$ and $t_{j2}$ must be allocated to a same ACM (e.g., due to shared memory, etc.), is defined based on the following relationship:

$$\sum_{k=1}^{p_{j1}/q_1} x_{ij1k} = \sum_{k=1}^{p_{j2}/q_1} x_{ij2k} \quad \forall i \quad (26)$$

CabSeparation constraint (27), which requires that the pair of applications $t_{j1}$ and $t_{j2}$ must be allocated to ACMs in separate cabinets, is defined based on the following relationship:

$$\sum_{i \in F_l} \left( \sum_{k=1}^{p_{j1}/q_1} x_{ij1k} + \sum_{k=1}^{p_{j2}/q_1} x_{ij2k} \right) \le 1 \quad \forall l = 1, 2 \quad (27)$$

CabCohabitation constraint (28), which requires that the pair of applications $t_{j1}$ and $t_{j2}$ must reside on the same cabinet (either left or right), is defined based on the following relationship:

$$\sum_{i \in F_l} \sum_{k=1}^{p_{j1}/q_1} x_{ij1k} = \sum_{i \in F_l} \sum_{k=1}^{p_{j2}/q_1} x_{ij2k} \quad \forall l = 1, 2 \quad (28)$$

ACMHabitation constraint (29), which requires that the application $t_{j1}$ must reside on the ACM $g_{i1}$, is defined based on the following relationship:

$$\sum_{k=1}^{p_{j1}/q_1} x_{i1j1k} = 1 \quad (29)$$

CabHab (30), which requires that the application $t_{j1}$ must reside on the cabinet $F_{l1}$ (i.e., if a CabHab is specified, no cabinet constraint is added to defn), is defined based on the following relationship:

$$\sum_{i \in F_{l1}} \sum_{k=1}^{p_{j1}/q_1} x_{ij1k} = 1 \quad (30)$$

ACMKeepOut (30b), which requires that the application $t_{j1}$ must keepout of the ACM $g_{i1}$, is defined based on the following relationship:

$$x_{i1j1k} = 0 \, \forall k \quad (30b)$$

Application messaging requirements—Applications send and receive messages using Virtual Links (VLs). A virtual link is a concept used to allocate network communication bandwidth to the communication needs of applications. To define VLs constraints, variable $z_{li} \in [0,1]$ is defined with value 1 if $VL_l$ is linked to processor $g_i$, 0 otherwise.

The receive and transmit virtual links (RX/TX virtual links) constraints can be mathematically stated as follows:

$$z_{li} \ge x_{ijk} \, \forall \, VL_l \in Sh_j; \forall j: \tau_j \text{ needs } VL_l; \quad (13)$$
$$\forall k = 1, \ldots, p_j/q_1; \forall i$$

$$\sum_{l: VL_l \in Sh_j} z_{li} \cdot b_l + \sum_j \sum_{k=1}^{p_j/q_1} x_{ijk} \cdot bus_{Rx}^j \le BW_{Rx}^i \quad (14)$$
$$\forall i = 1, \ldots, m$$

$$\sum_{l: VL_l \in Sh_j} z_{li} + \sum_j \sum_{k=1}^{p_j/q_1} x_{ijk} \cdot nus_{Rx}^j \le VC_{Rx}^i \, \forall i \quad (15)$$

-continued $$\sum_j \sum_{k=1}^{p_j/q_1} x_{ijk} \cdot bus_{Tx}^j \le BW_{Tx}^i \ \forall \ i \quad (16)$$

$$\sum_j \sum_{k=1}^{p_j/q_1} x_{ijk} \cdot nus_{Tx}^j \le VC_{Tx}^i \ \forall \ i \quad (17)$$

$$0 \le z_{li} \le 1 \ \forall \ l, i, \quad (18)$$

where $b_l$ is a known bandwidth of $VL_l$, $BW_{Rx}{}^i$ is max receive bandwidth at processor $g_i$, $VC_{Rx}{}^i$ is max Rx VL count at processor $g_i$, $BW_{Tx}{}^i$ is max transmit bandwidth at processor $g_i$, $VC_{Tx}{}^i$ is max Tx VL count at processor $g_i$, $Sh_j$ is a set of shared VLs of application j, $nus^j{}_{Rx}$ is number of unshared receive VLs of application j, $bus^j{}_{Rx}$ is a sum of bandwidth of unshared receive VLs of application j.

Memory Constraints—Memory resources in a processor ACM i (ACM $g_i$) may be provided in at least five varieties: RAM, ROM (flash), Non-Volatile Memory (NVM), End-System (ES) memory (related to ports), and Shared Memory Region (SMR). The RAM/ROM/NVM constraints are similar, with each application requiring a specified amount of each of the three types of memory. Constraints specifying bounds on the total size of memory allocated to applications on a processor (memory size of processor) are stated as follows:

$$\sum_j \sum_{k=1}^{p_j/q_1} x_{ijk} \cdot ra_j \le RA_i \ \forall \ i = 1, \ldots, m \quad (21)$$

$$\sum_j \sum_{k=1}^{p_j/q_1} x_{ijk} \cdot ro_j \le RO_i \ \forall \ i \quad (22)$$

$$\sum_j \sum_{k=1}^{p_j/q_1} x_{ijk} \cdot rn_j \le RN_i \ \forall \ i \quad (23)$$

where $ra_j$ is RAM needed by application j, $RA_i$ is total RAM provided by ACM $g_i$ $ro_j$ is ROM needed by partition j, $RO_i$ is total ROM provided by ACM $g_i$, $rn_j$ is NVM needed by application j, $RN_i$ is total VVM provided by ACM $g_i$.

Shared Memory Region (SMR)—Memory that is collectively used by a group of applications is referred to as a SMR. If the applications happen to get allocated to the same processor they can share the SMR; otherwise the SMR is duplicated. SMRs consume both ROM and RAM resources on a processor. To model the SMRs, consider the following definitions. Let $Ps_l$ (null is possible) be a set of applications needing access to SMR. Three kinds of SMRs exist: readAtACM (RG), readByP (RP), read/write (RW).

For the RG-SMRs: $Ps_l$=null. Define $Sg_i$ as a set of SMRs that are assigned to ACM $g_i$, (i.e., $Sg_i$={SMR: SMR assigned to ACM $g_i$}).

For RP-SMRs: SMRs can be duplicated on all ACMs that host $\tau_j$ in $Ps_l$. For the RP-SMRs, define $y_{il} \in [0,1]$ be 1 if $SMR_l$ is shared and is allocated to ACM $g_i$, 0 otherwise, (i.e., $y_{il}$ should be 1 if $\tau_j$ in $Ps_l$ is allocated to ACM $g_i$). Furthermore, Su can be defined as a set of unshared RP-SMRs, i.e. Su={RP-$SMIR_l$: $|Ps_l|$=1}.

For the RW-SMRs: applications in $Ps_l$ need to cohabitate on same $g_i$. To enforce cohabitation and allocate SMRs, let us define Srw as the set of RW-SMRs. Two things are necessary: (1) author constraints (shown as constraint set (26c)) that will allocate all applications in $Ps_l$, where $Ps_l$ is such that $SMR_l$ is in Srw, to the same processor. And (2) for $SMR_l$ in Srw, the fifth term is added below to specify memory consumption. The constraints that result are (61), (21a), (22a) and (62) as follows:

$$y_{il} \ge x_{ijk} \ \forall \ k = 1, \ldots, p_j/q_1; \forall \ j: \tau_j \in Ps_l; \quad (61)$$
$$\forall \ i = 1, \ldots m; \forall \ l: SMR_l \in RPSMR \setminus Su$$

$$\sum_{j \in \Gamma} \sum_{k=1}^{p_j/q_1} x_{ijk} \cdot ra_j + \sum_{l: SMR_l \in Sg_i} ra_l + \quad (21a)$$

$$\sum_{\substack{l: SMR_l \in \\ SharedRPSMRs}} y_{il} \cdot ra_l + \sum_{j': \tau_{j'} \in Ps_l \& \atop l: SMR_l \in Su} \sum_{k=1}^{p_{j'}/q_1} x_{ij'k} \cdot ra_l +$$

$$\sum_{\substack{l: SMRl \\ \in Srw}} \sum_{k=1}^{p_{j'}/q_1} x_{ij'k(\tau_{j'} \in Ps_l)} \cdot ra_l \le RA_i \ \forall \ i = 1, \ldots, m$$

$$\sum_{j \in \Gamma} \sum_{k=1}^{p_j/q_1} x_{ijk} \cdot ro_j + \sum_{l: SMR_l \in Sg_i} ro_l + \quad (22a)$$

$$\sum_{\substack{l: SMR_l \in \\ SharedRPSMRs}} y_{il} \cdot ro_l + \sum_{j': \tau_{j'} \in Ps_l \& \atop l: SMR_l \in Su} \sum_{k=1}^{p_{j'}/q_1} x_{ij'k} \cdot ro_l +$$

$$\sum_{\substack{l: SMRl \\ \in Srw}} \sum_{k=1}^{p_{j'}/q_1} x_{ij'k(\tau_{j'} \in Ps_l)} \cdot ro_l \le RO_i \ \forall \ i = 1, \ldots, m$$

$$0 \le y_{il} \le 1 \ \forall \ i = 1, \ldots, m; \forall \ l: SMR_l \in RPSMR \setminus Su \quad (62)$$

Non-Volatile Memory (NVM) Bandwidth Constraints—This constraint defines an upper bound at the ACM on total bandwidth of NVM access across all allocated applications.

Two modes of NVM access exist: normal operation and power down. The bandwidth of each is bounded separately. Each application is characterized by normal operation bandwidth and power down bandwidth ($bn_i,bp_i$).

Each ACM is characterized by limits ($BN^k,BP^k$).

The NVM bandwidth constraints are as follows:

$$\sum_j \sum_{k=1}^{p_j/q_1} x_{ijk} \cdot bn_j \le BN_i \ \forall \ i \quad (24)$$

$$\sum_j \sum_{k=1}^{p_j/q_1} x_{ijk} \cdot bp_j \le BP_i \ \forall \ i \quad (25)$$

End-system Memory Constraints—CommPorts within a processor enable communication of messages from and to the applications. The total memory consumed by the applications for this purpose (referred to as the End-system memory) on a processor is limited Transmitted messages are unshared. Some received messages may be shared between applications, in which case they also share CommPorts. To consider this memory limitation in the allocation of the applications and hence design of the processors 402-410, consider the following variable definitions and constraints.

For shared messages $Msg_l$: $SM_j$ is the set of shared Rx messages required by application $\tau_j$, $m_{li}$ in [0,1] is 1 if message l is received at ACM i, $esm_l$ is the maximum value of ES memory (across applications receiving message l) required for message l, and $ESM_i$ is the total ES memory available at ACM i.

For unshared messages: $mus^j_{Rx}$ is a total memory required by $\tau_j$'s Rx messages, $pus^j_{Rx}$ is the total count of $\tau_j$'s unshared Rx CommPorts, and $CPC^j_{Rx}$ is the upper bound on the processor $g_i$'s Rx CommPort count.

The constraint on end-system memory is then based on the following relationships:

$$m_{li} \geq x_{ijk} \ \forall \ Msg_l \in SM_j; \quad (51)$$
$$\forall \ j : \tau_j \text{ needs } Msg_l; \forall \ k = 1, \ldots, p_j/q_1; \forall \ i$$

$$\sum_{l: Msg_l \in SM_j} m_{li} \cdot esm_l + \sum_j \sum_{k=1}^{p_j/q_1} x_{ijk} \cdot (mus^j_{Rx} + mus^j_{Tx}) \leq ESM_i \quad (52)$$
$$\forall \ i = 1, \ldots, m$$

$$\sum_{l: Msg_l \in SM_j} m_{li} + \sum_j \sum_{k=1}^{p_j/q_1} x_{ijk} \cdot pus^j_{Rx} \leq CPC^i_{Rx} \ \forall \ i \quad (53)$$

$$\sum_j \sum_{k=1}^{p_j/q_1} x_{ijk} \cdot pus^j_{Tx} \leq CPC^i_{Tx} \ \forall \ i \quad (54)$$

$$0 \leq m_{li} \leq 1 \ \forall \ l: Msg_l \in SM_j, \ \forall \ j, i \quad (55)$$

where, $pus^j_{Rx}$ is a total count of $\tau_j$'s unshared Rx CommPorts, $pus^j_{Tx}$ is a total count of $\tau_j$'s unshared Tx CommPorts, $CPC^j_{Rx}$ is an upper bound on $g_i$'s Rx CommPort count, $Msg_l$ is shared messages, $SM_j$ is a set of shared receive messages required by the application $\tau_j$.

Figure 6:
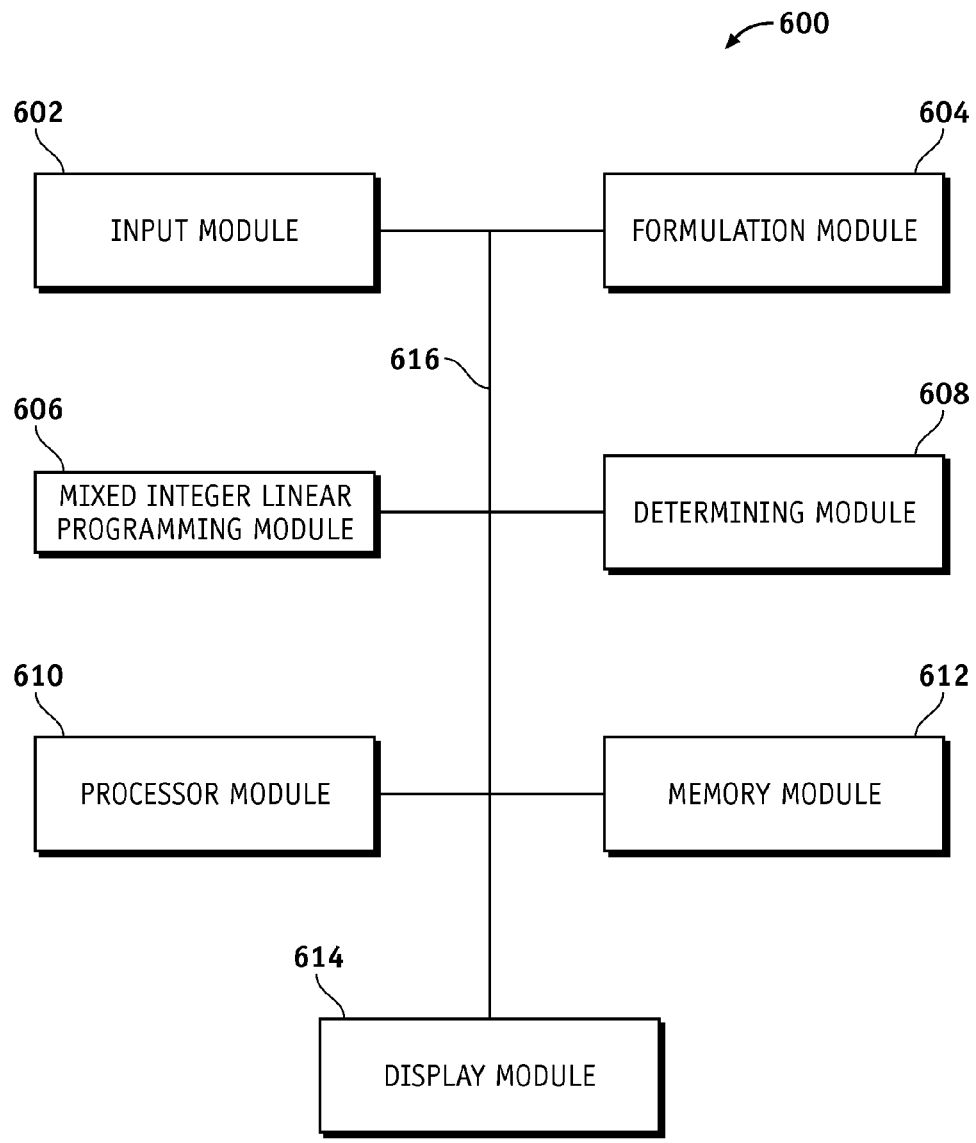
FIG. 6 is an illustration of an exemplary functional block diagram of a system for avionics system optimization according to an embodiment of the disclosure.

FIG. 6 is an illustration of an exemplary functional block diagram of a system 600 for avionics system optimization according to an embodiment of the disclosure. The system 600 significantly simplifies performance optimization of the large scale system such as avionics system, allowing: reduced system weight, maximized ability to absorb configuration changes by centering the design configuration, and minimized cost of future changes while meeting total system safety constraints. The system 600 may represent, for example but without limitation, a desktop, a laptop or notebook computer, a hand-held computing device (PDA, cell phone, palmtop, etc.), a mainframe, a server, a client, or any other type of special or general purpose computing device as may be desirable or appropriate for a given application or environment. The system 600 generally comprises a physical housing (not shown), an input module 602, a formulation module 604, a mixed integer linear programming module 606, a determining module 608, a processor module 610, a memory module 612, and a display module 614.

A practical system 600 may comprise any number of input modules, any number of processor modules, any number of memory modules, and any number of display modules. The illustrated system 600 depicts a simple embodiment for ease of description. These and other elements of the system 600 are interconnected together, allowing communication between the various elements of system 600. In one embodiment, these and other elements of the system 600 may be interconnected together via a communication link 616. Those of skill in the art will understand that the various illustrative blocks, modules, circuits, and processing logic described in connection with the embodiments disclosed herein may be implemented in hardware, computer-readable software, firmware, or any practical combination thereof. To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The input module 602 receives input data from a user and sends the input data to the formulation module 604. The input module 602 may comprise input means, for example but without limitation, activation keys, touch pads keys, locally or remotely accessed databases, and the like.

Formulation module 604 receives the input data and converts the input data into parameters of a set of linear in-equalities and an objective function.

Mixed integer linear programming module 606 uses the set of linear in-equalities and the objective function to compute, for example but without limitation, an optimal solution to a processor resource allocation, communication resource allocation, and the like, as explained above.

Determining module 608 determines processor requirements for an avionics system based on the optimal solution. Based on results of the optimal solution, resources on processors such as the processors 402-410, and a number of required processors, and the like may be determined.

The processor module 610 is configured to support functions of the system 600. The processor module 610 may control operations of the system 600 so that processes of the system 600 are suitably performed. For example, the processor module 610 controls operations of the mixed integer linear programming module 606 and the determining module 608 to perform mixed integer linear programming such that processor 402-410 requirements for an avionics system are determined based on the optimal solution. In this manner, the processor module 610 allows simplifying the development and performance optimization of networked systems that meets the operational and functional requirements of a set of known real-time avionics applications. In addition the processor module 610 performs centered design configuration, as explained in more detail below, to maximize an ability of absorbing changes thereby minimizing time and cost of future changes while meeting total system safety constraints.

The processor module 610 also controls the display module 614 to display input/output parameters, and the like. Further, the processor module 610 accesses the memory module 612 such as access to the input data. The processor module 610, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 610 comprises processing logic that is configured to carry out the functions, techniques, and processing tasks associated with the operation of system 600. In particular, the processing logic is configured to support operation of the mixed integer linear programming module 606, and the determining module 608 such that the optimal number and capability of processors to provide computational resources for a very large optimized system are determined.

The memory module 612 may be any suitable data storage area with suitable amount of memory that is formatted to support the operation of the system 600. Memory module 612 is configured to store, maintain, and provide data as needed to support the functionality of the system 600 in the manner described below. In practical embodiments, the memory module 612 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 612 may be coupled to the processor module 610 and configured to store, for example but without limitation, the input parameter values and the output parameter values corresponding to the a risk assessment scenario.

The memory module 612 may store, for example but without limitation, input from a user to formulate a set of linear inequalities such as the parameters for network communication and processor resource allocation. Additionally, memory module 612 may represent a dynamically updating database containing a table for purpose of computing using the processor module 610. The memory module 612 may also store, a computer program that is executed by the processor module 610, an operating system, an application program, tentative data used in executing a program processing, and the like. The memory module 612 may be coupled to the processor module 610 such that the processor module 610 can read information from and write information to memory module 612. As an example, the processor module 610 and memory module 612 may reside in their respective ASICs. The memory module 612 may also be integrated into the processor module 610. In an embodiment, the memory module 612 may comprise a cache memory for storing temporary variables or other intermediate information during execution of instructions to be executed by the processor module 610.

The display module 614 is configured to display input and output parameters of the system 600. The display module 614 displays results of an optimal solution to a processor resource allocation such as results shown in FIG. 8. The display module 614 may accept a user input operation to input and transmit data, and input operation commands for functions provided in the system 600. The display module 614 accepts the operation command, and outputs operation command information to the processor module 610 in response to the accepted operation command. The display module 614 may be formed by, for example but without limitation, an organic electro-luminescence (OEL) panel, liquid crystal panel (LCD), and the like. Various kinds of information can be displayed on the display module 614 via an image/video signal supplied from the processor module 610.

Figure 7:
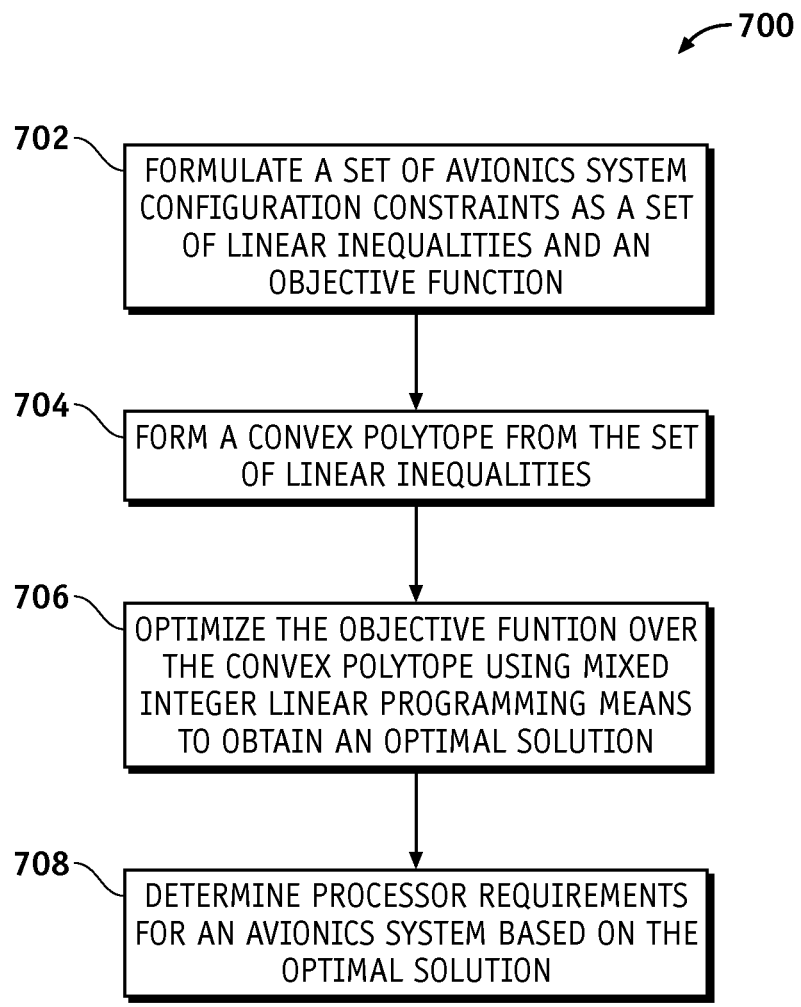
FIG. 7 is an illustration of an exemplary flow chart showing an avionics system optimization process according to an embodiment of the disclosure.

FIG. 7 is an illustration of an exemplary flow chart showing an avionics system optimization process according to an embodiment of the disclosure. The various tasks performed in connection with process 700 may be performed, by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a computer CPU such as the processor module 610 in which the computer-readable medium is stored. It should be appreciated that process 700 may include any number of additional or alternative tasks, the tasks shown in FIG. 6 need not be performed in the illustrated order, and process 700 may be incorporated into a more comprehensive procedure or process having additional functionality not described in detail herein. For illustrative purposes, the following description of process 600 may refer to elements mentioned above in connection with FIGS. 1-4 and 6. In practical embodiments, portions of the process 700 may be performed by different elements of the system 600 such as: the formulation module 604 the mixed integer linear programming module 606, the processor module 610, and the memory module 612. Process 700 may have functions, material, and structures that are similar to the embodiments shown in FIGS. 1-4 and 6. Therefore common features, functions, and elements may not be redundantly described here.

Process 700 may begin by formulating a set of avionics-system configuration constraints as a set of linear inequalities and an objective function (task 602) as discussed above.

The process 700 may continue by forming a convex polytope from the set of linear inequalities (task 704). A convex polytope (i.e., also known as a simplex) is a special case of a polytope, having the additional property that it is also a convex set of points in the n-dimensional space. A properly formulated set of linear inequalities will form a convex polytope, and thus be solvable over an objective function.

The process 700 may continue by optimizing the objective function over the convex polytope using mixed integer linear programming means to obtain an optimal solution (task 706). Linear programming (LP) is a mathematical method for determining a way to achieve the best outcome (such as maximum profit or lowest cost) in a given mathematical model for some list of requirements represented as linear equations. More formally, linear programming is a technique for the optimization of a linear objective function, subject to linear equality and linear inequality constraints. Given a polytope and a real-valued affine function defined on this polytope, a linear programming method will find a point on the polytope where this function has the smallest (or largest) value if such point exists, by searching through the polytope vertices. Linear programs are problems that can be expressed in canonical form: min $c^T x$ such that Ax<=b, where x represents the vector of variables (to be determined), c and b are vectors of (known) coefficients and A is a (known) matrix of coefficients. The expression to be maximized or minimized is called the objective function (i.e., cTx in this case). The equations Ax≤b are the constraints which specify a convex polytope over which the objective function is to be optimized (i.e., in this context, two vectors are comparable when every entry in one is less-than or equal-to the corresponding entry in the other. Otherwise, they are incomparable).

Linear programming can be applied to various fields of study. It is used most extensively in business and economics, but can also be utilized for some engineering problems. Industries that use linear programming models comprise transportation, energy, telecommunications, and manufacturing. It has proved useful in modeling diverse types of problems in planning, routing, scheduling, assignment, and design.

If the unknown variables are all required to be integers, then the problem is called an integer programming (IP) or integer linear programming (ILP) problem. In contrast to linear programming, which can be solved efficiently in the worst case, integer programming problems are in many practical situations (those with bounded variables) NP-hard. 0-1 integer programming or binary integer programming (BIP) is the special case of integer programming where variables are required to be 0 or 1 (rather than arbitrary integers). This problem is also classified as NP-hard, and in fact the decision version was one of Karp's 21 NP-complete problems.

If only some of the unknown variables are required to be integers, then the problem is called a mixed integer programming (MIP) problem. These are generally also NP-hard. There are however some important subclasses of IP and MIP problems that are efficiently solvable, most notably problems where the constraint matrix is totally unimodular and the right-hand sides of the constraints are integers. Advanced algorithms for solving integer linear programs include: cutting-plane method, branch and bound, branch and cut, branch and price, and if the problem has some extra structure, it may be possible to apply delayed column generation.

The process 700 may continue by determining processor requirements for an avionics system based on the optimal solution (task 708). Based on the results of the mixed integer linear programming solution, resources on processors, and a number of required processors is determined.

Figure 8:
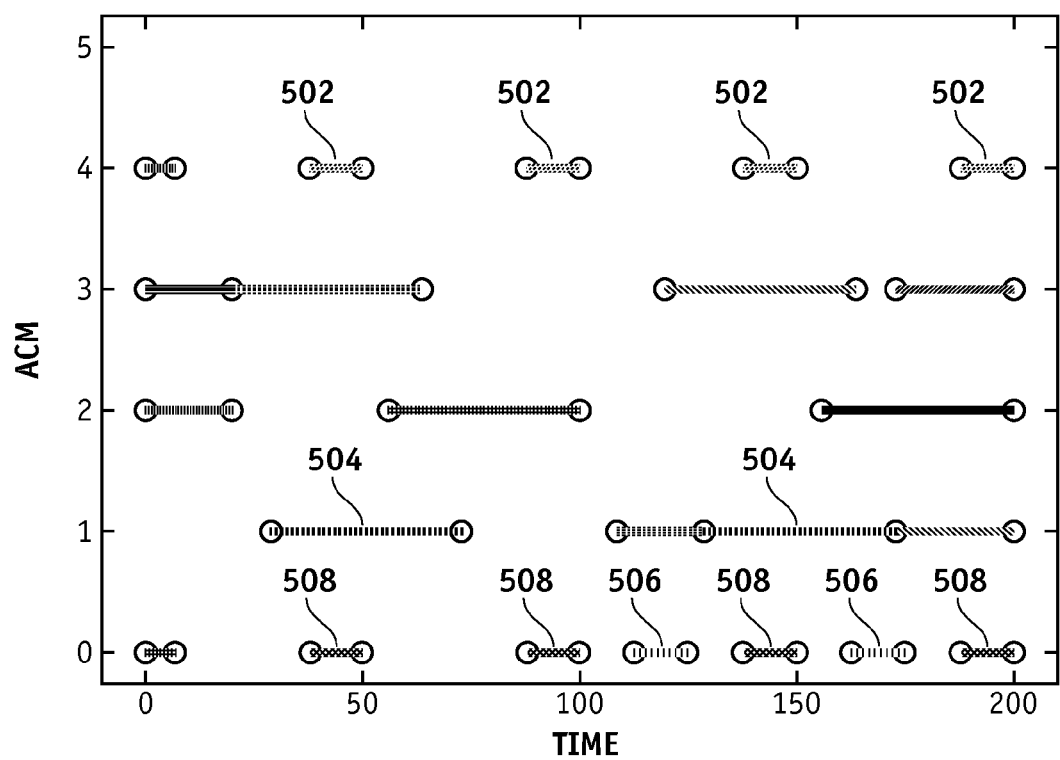
FIG. 8 is an illustration of an exemplary processor resource allocation over a period of time optimized according to an embodiment of the disclosure.

FIG. 8 is an illustration of an exemplary processor resource allocation over a period of time optimized according to an embodiment of the disclosure. As shown in FIG. 8, the two periodic instances of application 506 that were allocated to the processor 1 (FIG. 5) are now added to the four periodic instances of application 508 allocated to the processor 0. In this manner, as shown in FIG. 8, because of the more efficient resource allocation of the optimal solution, only five processors 0-4 are now needed instead of the five processors need in the non-optimized case illustrated in FIG. 5.

As mentioned above, an exemplary system described herein comprises the avionics processors, the network providing communications among the processors, and input/output (IO) gateways providing analog, discrete, and local digital network interfaces. As systems such as airplanes become more sophisticated, there is an ever increasing need for processing power, network bandwidth and interface variety within avionics systems. Determining a set of optimized application-to-processor allocation, message-to-network channel, parameter to message, and physical wire connections to the IO gateways to meet the performance, safety, operational availability requirements while minimizing networked system weight in an avionics system can be a very hard problem.

In one embodiment, an optimal resource allocation for a large scale avionics system is obtained by decomposing the system into a set of connected domains (domain decomposition), solving iteratively and successively for a centered design in each domain, and then iterating until a satisfactory measure of overall system level objectives is achieved as explained in more detail below.

Figure 9:
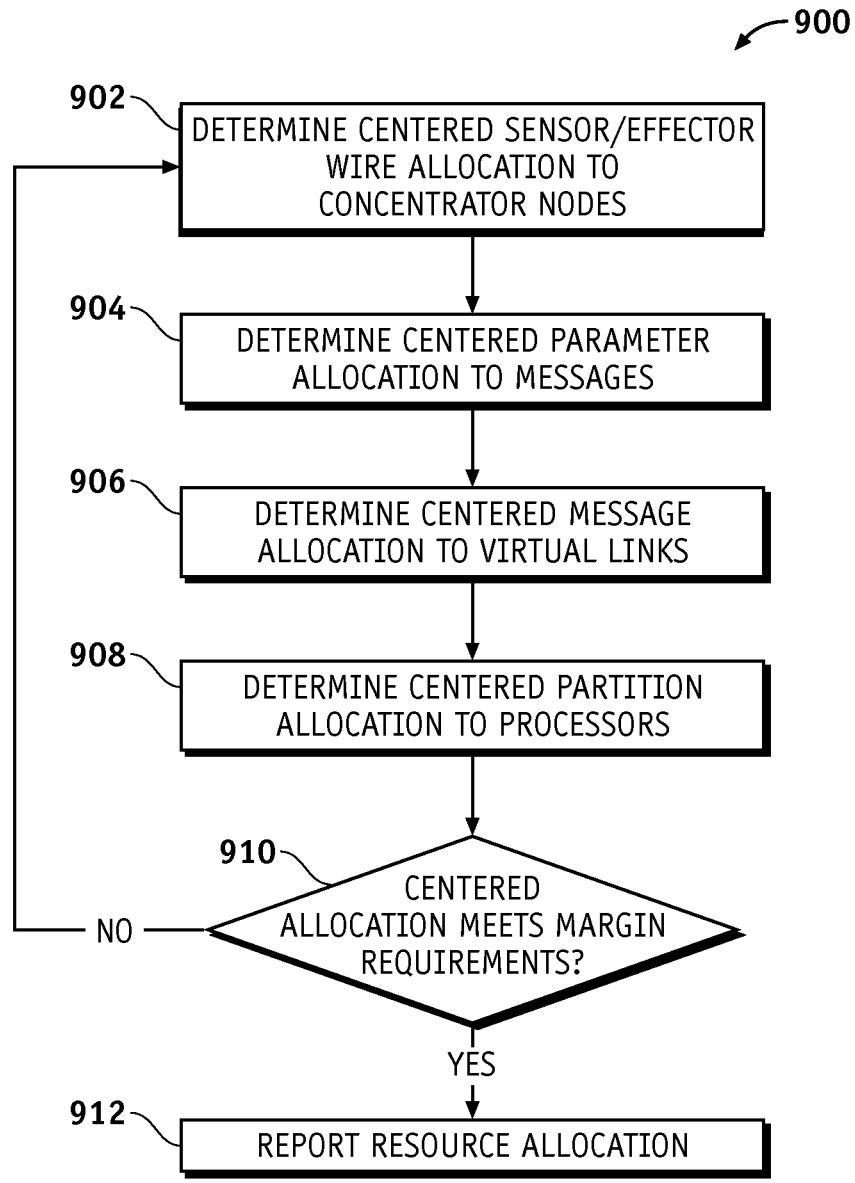
FIG. 9 is an illustration of an exemplary flow chart showing an avionics resource allocation optimization process according to an embodiment of the disclosure.

FIG. 9 is an illustration of an exemplary flow chart showing an avionics resource allocation optimization process 900 based on the centered design configuration according to an embodiment of the disclosure. The various tasks performed in connection with process 900 may be performed, by software, hardware, firmware, a computer-readable medium having computer executable instructions for performing the process method, or any combination thereof. The process 900 may be recorded in a computer-readable medium such as a semiconductor memory, a magnetic disk, an optical disk, and the like, and can be accessed and executed, for example, by a computer CPU such as the processor module 610 in which the computer-readable medium is stored. It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein. For illustrative purposes, the following description of process 900 may refer to elements mentioned above in connection with FIGS. 1-4 and 6-8. In practical embodiments, portions of the process 900 may be performed by different elements of the system 600 such as: the processor module 610, and the memory module 612. Process 900 may have functions, material, and structures that are similar to the embodiments shown in FIGS. 1-4 and 6-8. Therefore common features, functions, and elements may not be redundantly described here.

Process 900 determines an optimal allocation for a complex hardware system by decomposing the complex hardware system into a set of connected domains, solving iteratively and successively for a centered design in each domain, and then iterating until a satisfactory measure of overall system level objectives is achieved. Each domain cannot be resolved completely independent of the other domains. Each domain is resolved dependent to other domains. The boundaries of the domains are chosen to minimize the interaction with neighboring domains. Furthermore, there is a certain directional aspect to the interfaces of the domains. For example the Sensor/Effector wiring interfaces to I/O gateways are not a function of the network VLs. But, the network VLs are a function of the Sensor/Effector wiring interfaces to the I/O gateways. This allows the process 900 to generally hold constant the interface from the "lower" level domain while solving for the centered solution of the domain at hand. In some embodiments, however, there is a strong relationship between an upper and lower domain. In this case, the iteration is required to fully determine a centered design.

Process 900 may begin by determining centered sensor/effector wire allocation to concentrator nodes 322-326 and 412-416 (task 902). Sensor/Effector needs are characterized by interface types and performance while incurring wire weight. The I/O gateway function implementation has a limited number of analog, discrete, and serial digital interfaces. The gateway functions require a firm schedule to process the interfaces. In addition, processing these sensor/effector interfaces consumes the I/O gateway processor performance. The scheduling of the I/O gateway must also satisfy the latency constraints placed by a set of requirements. The outcome of the task 902 is the allocation of each of the sensor/effector interfaces to an I/O gateway with a 1st order processing schedule for the I/O gateway.

Process 900 may continue by determining centered parameter allocation to messages (task 904). Messages need to be formed with a functionally coherent set of parameters based on known publish/subscribe requirements. These requirements specify a single source and multiple destinations for each parameter or set of parameters. In addition, the requirements specify the nature and number of parameters in messages, how parameters need to be grouped, the maximum allowed transport latency for the parameter, and if there are any source select grouping for these parameters. A message may be comprised of one or more parameters. The task 904 holds constant the allocation of the interfaces to the sensors/effectors 302-320 to specific concentrator nodes 322-326 and 412-416. It develops a set of messages characterized by size and output port rate. A refined concentrator nodes 322-326 and 412-416 schedule is produced to verify viability of performance.

Process 900 may continue by determining centered message allocation to virtual links (task 906). Virtual links are the means for the system integrator to provide specific quality of service for specific messages while minimizing network bandwidth and achieving required latency. The virtual link is a logical construct that groups one or more messages from a single source and provides a guaranteed bandwidth to one or more destinations. Each message is assigned a sub-virtual link to provide a refinement of the quality of service within the virtual link for specific messages. Virtual links are characterized by priority, transmission timer period, transmission timer offset, maximum transmit unit, and a bandwidth allocation gap. The latter two define the virtual link bandwidth. Each transmitting Line Replaceable Unit (LRU) and each subscribing LRU will have constraints on the bandwidth and the number of virtual links. The LRU constraints need not be identical for all LRUs. The allocation of messages to virtual links needs to respect LRU requirements as well as latency requirements of parameters with the messages. The input to this stage is that all parameters are allocated to messages. An initial guess allocating the application to processing may be used. This can be done using information relating to large grouping of applications. The output is a set of messages allocated to virtual links with attributes that meet the latency requirements as well as known LRU virtual link and bandwidth limitations.

Process 900 may continue by determining centered application allocation to the processors 402-410 (task 908). Communication needs are characterized by the number of the virtual links (point to multipoint communication links) required by an application, along with the communication bandwidth of the virtual links. I/O needs are characterized by the memory size and port type required within each of the processors 402-410 end system. Input to the task 908 is the message to virtual link allocation. The output to the task 908 is an allocation of applications to processors 402-410 such that the resources consumed are sufficient as well as met some objective function as explained above, which can be level loading resource usage from any of the processors to processor.

Process 900 may continue by checking if a centered complex hardware system resource allocation meets margin requirements (inquiry task 910). If the centered complex hardware system resource allocation does not meet margin requirements (No branch of inquiry task 910), then process 900 returns to task 902. If the centered complex hardware system resource allocation meets margin requirements (Yes branch of inquiry task 910), then process 900 continues to task 912.

Process 900 may continue by reporting the centered complex hardware system resource allocation (task 912). Reporting may comprise, for example but without limitation, displaying on a display screen, generating a paper report, and the like.

In this way, processor optimal number, capability, and large scale system optimization through domain decomposition are provided enabling complex hardware system development such as avionics systems development on commercial and military aircraft. Thereby, simplifying the development and performance optimization of networked systems while reducing development time and cost, and ensuring that the application needs are satisfied.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 610 to cause the processor module 610 to perform specified operations. Such instructions, generally referred to as "computer program code" or "program code" (which may be grouped in the form of computer programs or other groupings), when executed, enable a complex hardware system optimization method of the system 600.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-4 and FIG. 6 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A system for resource allocation in a network including a plurality of processors and sensors, the system comprising:
   a computer programmed to simultaneously determine a minimum number of processors and processor computing capabilities needed to process messages over a plurality if virtual links in the network, wherein each virtual link represents a dedicated data communication path between one of the sensors and at least one of the processors in the network; and wherein simultaneously determining the number of processors and computing capabilities includes:
   determining a centered sensor/effector wire allocation to a router;
   determining a centered parameter allocation to the messages;
   determining a centered message allocation to the virtual links;
   determining an optimal number of centered processors;

and determining a centered application allocation to the processors.

2. The system of claim 1, wherein determining the number of processors and their computing capability includes determining a minimum number of processors and a processor type that provides stated computing margins for the processors.

3. The system of claim 1, wherein for a stated number of processors and computing capability, computing margins for the processors are maximized.

4. The system of claim 1, wherein determining the number of processors and computing capability includes determining a minimum number of processors given a set of applications that provides stated computing margin for the applications.

5. The system of claim 4, wherein each processor is assigned an application responsive to at least one of the sensors; and wherein determining the number of processors and the computing margin for the applications is based in part on application execution time and scheduling time.

6. The system of claim 1, wherein determining the number of processors and computing capability includes maximizing computing margins for a set of applications for a stated number of processors.

7. The system of claim 1, wherein the network is a network of processors and sensors distributed about an aircraft.

8. The system of claim 1, wherein at least one of the virtual links further includes a communication link between one of the sensors and one of the processors.

9. The system of claim 1, wherein the network further includes aircraft actuators; and wherein at least some of the virtual links are dedicated communications paths between the actuators and the processors.

10. A system for resource allocation in a network including a plurality of processors and sensors, the system comprising:
a computer programmed to simultaneously determine a minimum number of processors and processor computing capabilities needed to process messages over a plurality if virtual links in the network, wherein each virtual link represents a dedicated data communication path between one of the sensors and at least one of the processors in the network; and wherein simultaneously determining the number of processors and computing capabilities includes:
modeling the processors, sensors, and virtual links as a set of linear inequalities,
forming a convex polytope from the set of linear inequalities; and
optimizing an objective function over the convex polytope to obtain the number of processors and computing margins.

11. The system according to claim 10, wherein the set of linear inequalities includes:

$$\min \sum_{i=1}^{m} u_i \quad (1)$$

s.t.

$$\sum_{i} \sum_{k=1}^{p_j/q_1} x_{ijk} = 1 \ \forall \ j = 1, \ldots, n \quad (2)$$

$$x_{ijk} \leq u_i \ \forall \ i, j, k = 1, \ldots, p_j/q_1 \quad (3)$$

-continued $$\sum_{k'=1}^{p_j/q_1} \sum_{j:p_j \leq q_l} x_{ijk'} \frac{q_l}{p_j} e_j + \sum_{k'=k+1}^{k+(q_l/q_1)} \sum_{j:p_j > q_l} x_{ijk'} e_j \leq \quad (5)$$

$$q_l + (h - q_l)(1 - d_{il}) \ \forall \ k = 0, \frac{q_l}{q_1}, \frac{2q_l}{q_1}, \ldots, \frac{h - q_l}{q_1}; \forall \ l; \forall \ i$$

$$x_{ijk} \leq d_{il(l:p_j=q_l)} \ \forall \ k = 1, \ldots, \frac{p_j}{q_1}; \forall \ j; \forall \ i \quad (6a)$$

$$h \geq 0 \quad (6b)$$

$$x_{ijk} \in \{0, 1\} \ \forall \ k = 1, \ldots, (p_j/q_1); \forall \ i; \forall \ j \quad (9)$$

$$u_i, d_{il} \in [0, 1] \ \forall \ l = 1, \ldots, r; \forall \ i \quad (10)$$

where, $u_i$ is a processor, x is an unknown assignment variable, h is an unknown processor speed, d is a scheduling variable, $e_j$ is a sum total of execution times of applications i assigned to a bin, $q_l$ is a bin size for processor $u_i$, $q_1$ is a bin increment for the $q_l$, $p_j$ is period of i-th application.

12. The system according to claim 10, wherein the set of linear inequalities includes:

$$\max mc \quad (1a)$$

$$mc \leq H - \sum_{j} \sum_{k=1}^{p_j/q_1} x_{ijk} e_j H / p_j \ \forall \ i \quad (2a)$$

$$x_{ijk} \leq u_i \ \forall \ i, j, k = 1, \ldots, p_j/q_1 \quad (3)$$

$$\sum_{k'=1}^{p_j/q_1} \sum_{j:p_j \leq q_l} x_{ijk'} \frac{q_l}{p_j} e_j + \sum_{k'=k+1}^{k+(q_l/q_1)} \sum_{j:p_j > q_l} x_{ijk'} e_j \leq q_l + (h - q_l)(1 - d_{il}) \quad (5)$$

$$\forall \ k = 0, \frac{q_l}{q_1}, \frac{2q_l}{q_1}, \ldots, \frac{h - q_l}{q_1}; \forall \ l; \forall \ i$$

$$x_{ijk} \leq d_{il(l:p_j=q_l)} \ \forall \ k = 1, \ldots, \frac{p_j}{q_1}; \forall \ j; \forall \ i \quad (6a)$$

$$h \geq 0 \quad (6b)$$

$$x_{ijk} \in \{0, 1\} \ \forall \ k = 1, \ldots, (p_j/q_1); \forall \ i; \forall \ j \quad (9)$$

$$u_i, d_{il} \in [0, 1] \ \forall \ l = 1, \ldots r; \forall \ i \quad (10)$$

where, mc is a minimum compute margin, H is a hyperperiod, x is an unknown assignment variable, h is an unknown compute margin, d is a scheduling variable, $e_j$ is a sum total of execution times of applications i assigned to a bin, $q_l$ is a bin size for processor $u_i$, $q_1$ is a bin increment for the $q_l$, $p_j$ is period of i-th application.

13. The system according to claim 10, wherein the set of linear inequalities includes:

$$\max mmc \quad (1c)$$

$$\sum_{i} \sum_{k=1}^{p_j/q_1} x_{ijk} = 1 \ \forall \ j = 1, \ldots, n \quad (2)$$

$$x_{ijk} \leq u_i \ \forall \ i, j, k = 1, \ldots, p_j/q_1 \quad (3)$$

-continued $$mmc \le q_l + (H - q_l)(1 - d_{il}) - \sum_{j:\, p_j \le q_l} \sum_{k'=1}^{p_j/q_1} x_{ijk'} \frac{q_l}{p_j} e_j - \sum_{j:\, p_j > q_l} \sum_{k'=kmod(p_j/q_1)+1}^{kmod(p_j/q_1)+(q_l/q_1)} x_{ijk'} e_j \quad (5e)$$

$$\forall k = 0, \frac{q_l}{q_1}, 2\frac{q_l}{q_1}, \ldots, \frac{(H-q_l)}{q_1}$$

$$\forall l = 1, \ldots, r; \forall i = 1, \ldots, m$$

$$x_{ijk} \le d_{il(l:\, p_j = q_l)} \quad \forall k = 1, \ldots, \frac{p_j}{q_1}; \forall j; \forall i \quad (6a)$$

$$h \ge 0 \quad (6b)$$

$$x_{ijk} \in \{0, 1\} \quad \forall k = 1, \ldots, (p_j/q_1); \forall i; \forall j \quad (9)$$

$$u_i, d_{il} \in [0, 1] \quad \forall l = 1, \ldots, r; \forall i \quad (10)$$

where, mmc is a minimum value of the compute margin at the minor frame level, $u_i$ is a processor, x is an unknown assignment variable, h is an unknown compute margin at the minor frame level, H is hyper-period, d is a scheduling variable, $e_j$ is a sum total of execution times of applications i assigned to a bin, $q_l$ is a bin size for processor $u_i$, $q_1$ is a bin increment for the $q_l$, $p_j$ is period of i-th application.

14. The system according to claim 10, wherein the set of linear inequalities includes:

$$m_{li} \ge x_{ijk} \quad \forall\, Msg_l \in SM_j; \quad (51)$$
$$\forall j:\tau_j \text{ needs } Msg_l; \forall k = 1, \ldots, p_j/q_1; \forall i$$

$$\sum_{l:\, Msg_l \in SM_j} m_{li} \cdot esm_l + \sum_j \sum_{k=1}^{p_j/q_1} x_{ijk} \cdot (mus^j_{Rx} + mus^j_{Tx}) \le ESM_i \quad (52)$$

$$\forall i = 1, \ldots, m$$

$$\sum_{l:\, Msg_l \in SM_j} m_{li} + \sum_j \sum_{k=1}^{p_j/q_1} x_{ijk} \cdot pus^j_{Rx} \le CPC^i_{Rx} \quad \forall i \quad (53)$$

$$\sum_j \sum_{k=1}^{p_j/q_1} x_{ijk} \cdot pus^j_{Tx} \le CPC^i_{Tx} \quad \forall i \quad (54)$$

$$0 \le m_{li} \le 1 \quad \forall\, l:\, Msg_l \in SM_j, \forall j, i \quad (55)$$

where, x is an unknown assignment variable, $SM_j$ is a set of shared Rx messages required by application $\tau_j$, $m_{li}$, in [0,1] is 1 if message l is received at ACM i, $esm_l$ is a maximum value of ES memory required for the message l, $ESM_i$ is a total ES memory available at ACM i, $mus^j_{Rx}$ is a total memory required by $\tau_j$'s Rx messages, $pus^j_{Rx}$ is a total count of $\tau_j$'s unshared Rx CommPorts, $pus^j_{Tx}$ is a total count of $\tau_j$'s unshared Tx CommPorts, $CPC^j_{Rx}$ is an upper bound on $g_i$'s Rx CommPort count, $Msg_l$ is shared messages, $q_1$ is a bin increment, $p_j$ is period of i-th application.

15. The system according to claim 10, wherein the set of linear inequalities includes:

$$z_{li} \ge x_{ijk} \quad \forall\, VL_l \in Sh_j; \forall j:\tau_j \text{ needs } VL_l; \quad (13)$$
$$\forall k = 1, \ldots, p_j/q_1; \forall i$$

$$\sum_{l:\, VL_l \in Sh_j} z_{li} \cdot b_l + \sum_j \sum_{k=1}^{p_j/q_1} x_{ijk} \cdot bus^j_{Rx} \le BW^i_{Rx} \quad (14)$$

$$\forall i = 1, \ldots, m$$

$$\sum_{l:\, VL_l \in Sh_j} z_{li} + \sum_j \sum_{k=1}^{p_j/q_1} x_{ijk} \cdot nus^j_{Rx} \le VC^i_{Rx} \quad \forall i \quad (15)$$

$$\sum_j \sum_{k=1}^{p_j/q_1} x_{ijk} \cdot bus^j_{Tx} \le BW^i_{Tx} \quad \forall i \quad (16)$$

$$\sum_j \sum_{k=1}^{p_j/q_1} x_{ijk} \cdot nus^j_{Tx} \le VC^i_{Tx} \quad \forall i \quad (17)$$

$$0 \le z_{li} \le 1 \quad \forall l, i \quad (18)$$

where, $z_{li} \in [0,1]$ is defined with value 1 if $VL_l$ is linked to processor $g_i$, 0 otherwise, $b_l$ is a known bandwidth of $VL_l$, $BW_{Rx}^i$ is max receive bandwidth at processor $g_i$, $VC_{Rx}^i$ is max receive VL count at processor $g_i$, $BW_{Tx}^i$ is max transmit bandwidth at processor $g_i$, $VC_{Tx}^i$ is max transmit VL count at processor $g_i$, $Sh_j$ is a set of shared VLs of application j, $nus^j_{Rx}$ is number of unshared receive VLs of application j, $bus^j_{Rx}$ is a sum of bandwidth of unshared receive VLs of application j, $p_j$ is period of i-th application, $q_1$ is a bin increment.

16. The system according to claim 10, wherein the set of linear inequalities includes:

$$\sum_j \sum_{k=1}^{p_j/q_1} x_{ijk} \cdot ra_j \le RA_i \quad \forall i = 1, \ldots, m \quad (21)$$

$$\sum_j \sum_{k=1}^{p_j/q_1} x_{ijk} \cdot ro_j \le RO_i \quad \forall i \quad (22)$$

$$\sum_j \sum_{k=1}^{p_j/q_1} x_{ijk} \cdot rn_j \le RN_i \quad \forall i \quad (23)$$

where, $ra_j$ is RAM needed by application j, $RA_i$ is total RAM provided by ACM $g_i$, $ro_j$ is ROM needed by application j, $RO_i$ is total ROM provided by ACM $g_i$, $rn_j$ is Non-Volatile Memory needed by application j, $RN_i$ is total Non-Volatile Memory provided by ACM $g_i$, $q_1$ is a bin increment, $p_j$ is period of i-th application.

17. The system according to claim 10, wherein the set of linear inequalities includes:

$$y_{il} \ge x_{ijk} \quad \forall k = 1, \ldots, p_j/q_1; \forall j:\tau_j \in Ps_l; \quad (61)$$
$$\forall i = 1, \ldots, m; \forall l: SMR_l \in RPSMR \backslash Su$$

-continued $$\sum_{j\in\Gamma}\sum_{k=1}^{p_j/q_1} x_{ijk}\cdot ra_j + \sum_{l:SMR_l\in Sg_i} ra_l + \quad (21a)$$

$$\sum_{\substack{l:SMR_l\in \\ SharedRPSMRs}} y_{il}\cdot ra_l + \sum_{j':\tau_{j'}\in Ps_l \&} \sum_{l:SMR_l\in Su}^{p_{j'}/q_1} x_{ij'k}\cdot ra_l +$$

$$\sum_{\substack{l:SMR_l \\ \in Srw}} \sum_{k=1}^{p_{j'}/q_1} x_{ij'k(\tau_{j'}\in Ps_l)} \cdot ra_l \leq RA_i \ \forall \ i=1,\dots,m$$

$$\sum_{j\in\Gamma}\sum_{k=1}^{p_j/q_1} x_{ijk}\cdot ro_j + \sum_{l:SMR_l\in Sg_i} ro_l + \quad (22a)$$

$$\sum_{\substack{l:SMR_l\in \\ SharedRPSMRs}} y_{il}\cdot ro_l + \sum_{j':\tau_{j'}\in Ps_l \&} \sum_{l:SMR_l\in Su}^{p_{j'}/q_1} x_{ij'k}\cdot ro_l +$$

$$\sum_{\substack{l:SMR_l \\ \in Srw}} \sum_{k=1}^{p_{j'}/q_1} x_{ij'k(\tau_{j'}\in Ps_l)} \cdot ro_l \leq RO_i \ \forall \ i=1,\dots,m$$

$$0 \leq y_{il} \leq 1 \ \forall \ i=1,\dots,m;\ \forall\ l:SMR_l \in RPSMR\backslash Su \quad (62)$$

where, x is an unknown assignment variable, $q_1$ is a bin increment, $p_j$ is period of j-th application, $y_{il}\in[0,1]$ is 1 if $SMR_l$ is shared and is allocated to ACM $g_i$, 0 otherwise, $Su=\{RP\text{-}SMR_l: |Ps_l|=1\}$, $\tau_i$ is a set of n applications, Srw is a set of RW-SMRs, $SMR_l$ is shared memory region, RPSMR is RP-SMRs, $Ps_l$ is a set of applications needing access to $SMR_l$, $ra_j$ is RAM needed by application j, $RA_i$ is total RAM provided by ACM $g_i$, $ro_j$ is ROM needed by application j, $RO_i$ is total ROM provided by ACM $g_i$, $rn_j$ is Non-Volatile Memory needed by application j, $RN_i$ is total Non-Volatile Memory provided by ACM $g_i$, m is a number of processors.

18. The system according to claim 10, wherein the set of linear inequalities includes:

$$\sum_j \sum_{k=1}^{p_j/q_1} x_{ijk}\cdot bn_j \leq BN_i \ \forall\ i \quad (24)$$

$$\sum_j \sum_{k=1}^{p_j/q_1} x_{ijk}\cdot bp_j \leq BP_i \ \forall\ i \quad (25)$$

where, x is an unknown assignment variable, $q_1$ is a bin increment, $p_j$ is period of j-th application, $bn_j$ is normal operation bandwidth, $bp_j$ is power down bandwidth, $BN_i$ is a bound on the $bn_j$, $BP_i$ is a bound on the $bp_j$.

19. The system according to claim 10, wherein the network is part of an avionics system.

20. A method of allocating resources in a network including a plurality of processors and sensors, the method comprising:
simultaneously determining a minimum number of processors and processor computing capabilities needed to process messages over a plurality of virtual links in the network, wherein each virtual link represents a dedicated data communication path between one of the sensors and at least one of the processors in the network; and wherein simultaneously determining the number of processors and computing capabilities includes:
modeling the processors, sensors, and virtual links as a set of linear inequalities,
forming a convex polytope from the set of linear inequalities; and
optimizing an objective function over the convex polytope to obtain the number of processors and computing margins.

21. A method of allocating resources in a network including a plurality of processors and sensors, the method comprising:
simultaneously determining a minimum number of processors and processor computing capabilities needed to process messages over a plurality of virtual links in the network, wherein each virtual link represents a dedicated data communication path between one of the sensors and at least one of the processors in the network; and wherein simultaneously determining the number of processors and computing capabilities includes:
determining a centered sensor/effector wire allocation to a router;
determining a centered parameter allocation to the messages;
determining a centered message allocation to the virtual links;
determining an optimal number of centered processors;
and determining a centered application allocation to the processors.

22. The method of claim 21, wherein determining the number of processors and their computing capabilities includes determining a minimum number of processors and a processor type that provides stated computing margins for the processors.

23. The method of claim 21, wherein for a stated number of processors and computing capabilities, computing margins for the processors are maximized.

24. The method of claim 21, wherein determining the number of processors and computing capabilities includes determining a minimum number of processors given a set of applications that provides stated computing margin for the applications.

25. The method of claim 24, wherein each processor is assigned an application responsive to at least one of the sensors; and wherein determining the number of processors and the computing margin for the applications is based in part on application execution time and scheduling time.

26. The method of claim 21, wherein determining the number of processors and computing capabilities includes maximizing computing margins for a set of applications for a stated number of processors.

27. The method of claim 21, wherein the network is a network of processors and sensors distributed about an aircraft.

28. The method of claim 21, wherein at least one of the virtual links further includes a communication link between one of the sensors and one of the processors.

29. The method of claim 21, wherein the network further includes aircraft actuators; and wherein at least some of the virtual links are dedicated communications paths between the actuators and the processors.

* * * * *